Oct. 25, 1966   M. MAGID   3,281,658
DOUBLE INTERMEDIATE POSITION SWITCHING CIRCUITS
PROVIDING FOR COARSE, AND VERNIER ADJUSTMENTS
Filed Feb. 5, 1964
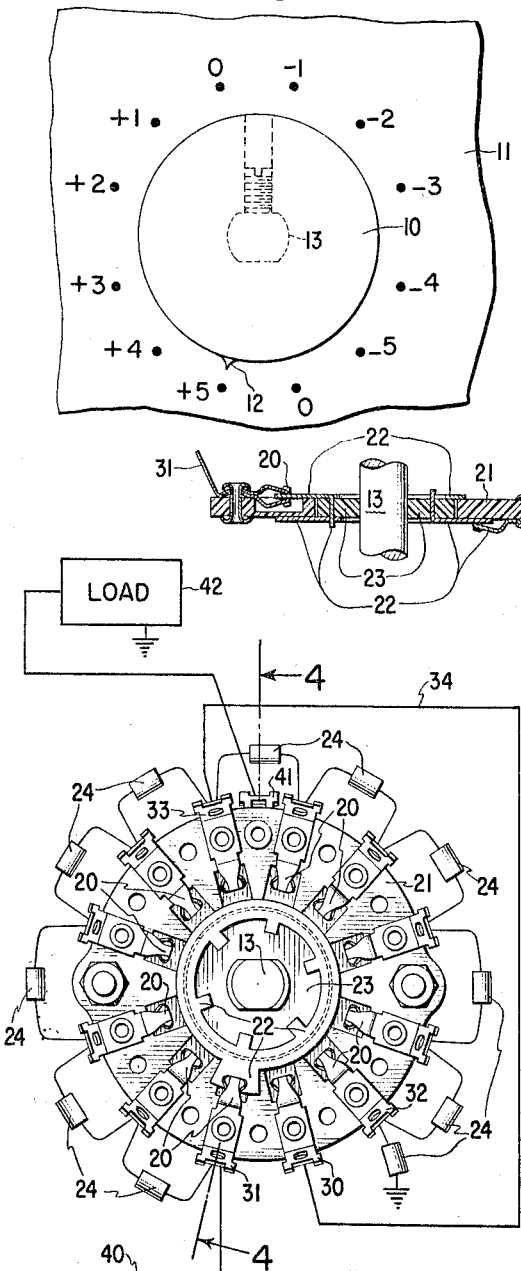
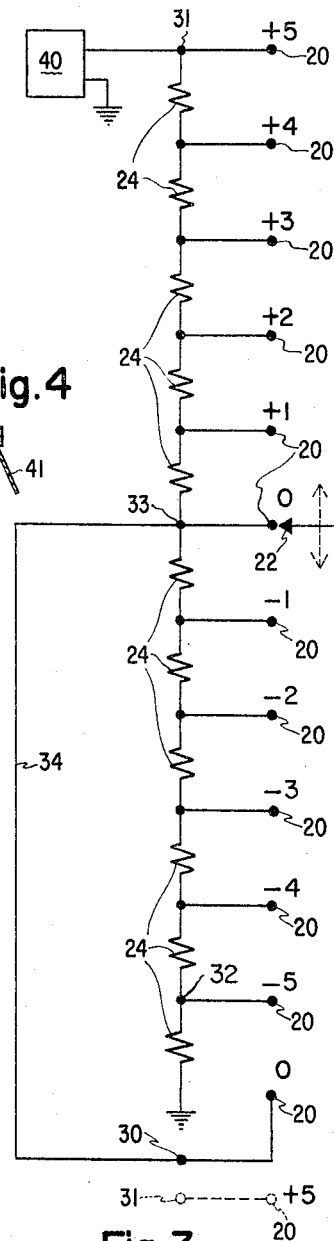
INVENTOR.
Milton Magid
BY
Marshall J. Breen
ATTORNEY
WITNESS
William Martins Jr.

United States Patent Office 3,281,658
Patented Oct. 25, 1966

3,281,658
DOUBLE INTERMEDIATE POSITION SWITCHING CIRCUITS PROVIDING FOR COARSE, AND VERNIER ADJUSTMENTS
Milton Magid, Rye, N.Y., assignor to The Singer Company, New York, N.Y., a corporation of New Jersey
Filed Feb. 5, 1964, Ser. No. 342,731
4 Claims. (Cl. 323—79)

This invention relates to electrical switching circuits and particularly to a novel connection between terminals of a multi-position rotary switch employed to select desired attenuation or impedance values.

In operation of electrical and electronic apparatus which is adjustable, the operator frequently desires to vary the effect of one or more impedances in order to obtain a desired result or measurement. Ofter, this requires the operator to adjust the impedances to a large number of values until the result or measurement is obtained. In other words, he might be required to use a time consuming trial-and-error method of reaching his objective. When the operator must complete his job quickly, as in an assembly line, in repair of costly equipment, in complex experimental procedures, and in making measurements in monitoring of signals from signal sources, transmitters or automatic control equipment and the like, or in performing bridge measurements, it is extremely desirable that switching can be performed with maximum speed. In the case of multi-position switches, much time can be expended in needlessly adjusting a rotary switch through the full range of values when searching for the proper one. In addition, the stress on the contacts of a switch which must be adjusted through most of its range of contact positions for each adjustment to be made to a position to be found by trial and error, will significantly increase wear and deterioration of the contacts. Where highly accurate components are to be selected by such contacts, wear of their surfaces, oxidation and pitting may significantly change the impedance of contacts and hence the apparatus, operating to significantly reduce the accuracy below that desired.

A desirable solution to this problem is to provide a single, multi-position switch providing both coarse and fine adjustments of impedance, inductance, capacitance, or amplification, etc. Such a switch will be of greatest utility where rapid adjustments to various levels are necessary and where the accuracy of adjustment will vary depending upon the specific objective of personnel employing the equipment at a given time. This invention requires only a single control to vary on a coarse or vernier basis and requires a minimal quantity of components to provide such a versatile switching circuit. This invention is uncomplicated in principle, easily used in practice, reduces manipulation required to make adjustments and minimizes the required number of components employed.

In accordance with this invention there is provided in an electrical circuit a rotary switch having several selectable contacts mounted on a support. A selector contact is adapted to engage with each one of the selectable contacts for only one range of angular positions of the selector contact with respect to the selectable contacts. A first pair of selectable contacts which are spaced from each other by a substantial angle of rotation of the switch are connected together electrically. One of the first pair of selectable contacts is a reference contact located adjacent to a second pair of selectable contacts. The other is an intermediate contact. Each of the second pair is adapted, when engaged with the selector contact, to adjust the switch circuit to substantially an extreme impedance value selectable by the switch.

Further in accordance with this invention, the second pair of contacts is connected together by a number of impedances connected between adjacent selectable contacts, preferably in consecutive order with respect to their angular position about their support including the intermediate contact and excluding the reference contact. The reference contact is connected only to the impedances connected to the intermediate contact. Preferably, one of the second pair of contacts will be connected to a reference point for connection to an input circuit and an output circuit. The selector contact and the other of the second pair of contacts can be connected to a respective one of the other terminals of the input and output circuits.

Moreover, in accordance with another aspect of this invention, each of the selectable contacts can be connected to a separate impedance element with those impedance elements having their opposite ends connected together with the exception that the first pair of selectable contacts is connected to the same impedance element.

Further aspects of my invention are described below with reference to the attached drawings in which:

FIG. 1 shows a plan view of a knob and an indicator dial plate of an electrical rotary switch employed in accordance with this invention;

FIG. 2 is a plan view of the structure of the switch shown in FIG. 1 with knob and dial plate removed, and with an electrical circuit connected thereto in accordance with this invention;

FIG. 3 is an electrical schematic diagram of the electrical circuit shown in FIG. 2 adjusted to a different position;

FIG. 4 is a partially sectional view taken generally along line 4—4 of FIG. 2 showing the contact structure with elements rearranged for convenience of illustration.

Referring to the drawings, a practical application of this invention as adapted to use in an input attenuator circuit which is calibrated in, say, decibels of attenuation is shown. As an example of a practical attenuator circuit, a selector switch is shown in which the unique locations of the two 0 db positions on the 1 db step switch permit level control either in 1 db steps to +5 or —5 db about 0 db or a variation from —5 through 0 to +5 db on adjacent contacts of the switch. The one db step switch rotates continuously, i.e. without a mechanical stop, so that when one searches for power levels, the effective gain of the amplifier can be varied ±5 db without the necessity of rotating the control through most or all of the eleven positions provided in conventional 10 db attenuation switches.

In FIG. 1, a selector knob 10 is shown which can be rotated continuously clockwise or counterclockwise from +5 db of attenuation through 0 db to —5 db in integral steps of 1 db or 5 db because a second zero switch position, providing a double zero, is located between the +5 db and —5 db switch positions as indicated by the numerals and index dots marked on the dial plate 11. The marker 12 projecting from the knob is shown positioned opposite the +5 db index dot indicating that the attenuator is adjusted to provide an output signal of +5 db with respect to a level referred to a zero db. The level of zero db assigned in FIG. 1 is chosen arbitrarily and any consistent set of values could be substituted for the numerals shown. For example, if the dot marked —5 db were chosen to be indicative of a level of 0 db, then the +5 db marker would correspond to a level of a +10 db and the 0 db marker would correspond to a level of +5 db. Then the switch would have *double* +5 db positions instead of *double* zero positions.

The knob 10 is attached (by a setscrew shown in phantom) to the operating shaft 13 of a typical multi-position, continuously rotatable, selector switch, without a mechanical stop, which is shown in FIG. 2 as a part of one form of novel circuit arrangement in accordance with this invention.

Twelve stationary fixed contacts 20 of the switch are mounted on a first, rigid base 21 composed of electrical insulation.

Referring to FIGS. 2 and 3, the +5 db dot on dial 11 indicating minimum attenuation corresponds to the contact 20 associated with an extreme position terminal 31. The upper 0 db dot on dial 11, indicating an intermediate position of the attenuator, corresponds to the contact 20 associated with an intermediate terminal 33. The lower 0 db dot corresponds to a reference terminal 30 and −5 db dot corresponds to another extreme position terminal 32.

Referring again to FIG. 2, a movable selector contact 22 is mounted on a second rigid base 23 mechanically rotatable with respect to the first base by twisting knob 10 to drive the shaft 13 on which the second base 23 is mounted.

Most of the contacts 20 are directly connected in a chain to the contacts 20 adjacent to them through connections of resistors 24 between the terminals associated with the contacts. Thus resistors 24 are connected in series as shown in FIG. 3.

To provide the *double zero* positions shown on dial 11, although the contact 20 (connected to a terminal 30) is not connected in the chain to the contacts connected to the adjacent extreme position terminals 31 and 32, terminal 30 is connected to another intermediate terminal 33 by line 34. Intermediate terminal 33 is spaced from reference terminal 30 by 180° or 5 db about the circumference of the base 21. In practice, of course, the spacing need not be exactly 180° or 5 db, but should be of some significance in terms of the number of fixed contacts 20. The number could be unequal for opposite directions of rotation between contacts 20 associated with terminals 30 and 33. Extreme position terminal 31 is shown connected to one terminal of a source 40 which is grounded at its other terminal. The movable contact 22 is shown connected through its terminal 41 (see FIG. 4 also) to one terminal of a load 42 which is also grounded at its other terminal. Extreme position terminal 32 is connected to the grounded terminals of source 40 and load 42 through a resistor 24.

By reference to FIG. 1, it may be seen that the position of the movable contact 22 in engagement with the contact 20 associated with terminal 31 is indicated on the dial 11 by marker 12 to be at a level of +5 db. The full potential of the source 40 is connected to load 42 without attenuation. By rotating the shaft 13 clockwise with respect to FIGS. 1 and 2, the power level connected to the load 42 through movable contact 22 will be reduced through zero by integral steps of one decibel of attenuation.

By rotating the shaft 13 counterclockwise, the power delivered to load 42 through contact 22 will be decreased through zero by two steps of 5 db of attenuation. Thus, simply by connecting terminals 30 and 33 with line 34 (providing a double zero), it is possible to have a "vernier" and "coarse" adjustment of db levels of attenuation controlled by a single multi-position selector switch.

In FIG. 3, the electrical schematic diagram of the switch circuit of FIG. 2 is shown after movable contact 22 has been adjusted so that it engages the contact 20 connected to intermediate terminal 33 providing a level of zero db. Also, the terminal 31 and its associated contact 20 are shown in phantom at the lower portion of FIG. 3 to illustrate the juxtaposition of the terminal 30 with terminals 31 and 32, shown in FIG. 2.

FIG. 4 shows the mechanical connections of contact 22 to terminal 41 and to terminal 31 through the contact 20, integral with it.

The arrangement of the terminals 30, 31, and 32 may be altered with those terminals juxtaposed in numerous ways. The plurality of resistors could be replaced by an inductor tapped to give the proper attenuation value. Moreover, the resistors 24 can be impedance elements of any kind or they may be removed and appropriate resistors or impedance elements can be connected between the contacts 20 and "ground" providing functionally identical type of attenuator, potentiometer, decade box and the like. The resistors 24 could be replaced by active elements such as sources of potential and active rather than passive networks or elements. For example, each resistor may be replaced by an electron space discharge device, a transistor, a Zener (breakdown) diode, any other semiconductor element and the like. The general circuit arrangement of the switch providing the "coarse" and "verner" double "zero" adjustment of operation of the circuit can be useful in connection with any of such elements. This invention can also be useful in connection with selection of switching circuitry, i.e., contact making and breaking circuitry and electronic switching.

Having thus set forth the nature of my invention, what I claim herein is:

1. A rotary switching circuit including
 (a) a wiper,
 (b) a plurality of terminals spaced in a circle,
 (c) said wiper and said terminals being mounted on separate members, said members being relatively rotatable and said wiper and said terminals being positioned to permit said wiper to contact each one of said terminals in sequence in response to rotation of one of said members relative to the other of said members,
 (d) a first one of said terminals being a reference terminal,
 (e) a second one of said terminals being immediately adjacent said first terminal,
 (f) a third one of said terminals being immediately adjacent said second terminal on the side thereof opposite said first terminal,
 (g) a plurality of impedance elements being connected in series to form a chain of impedance elements between said first terminal and said third terminal,
 (h) each of the junctions between said impedance elements being connected in order to one of said terminals with the exception of said second terminal,
 (i) said second terminal being connected to one of said junctions between the ends of said chain of impedance elements.

2. A switching circuit including
 (a) a plurality of selectable contacts mounted on a first member,
 (b) a selector contact mounted on a second member,
 (c) means for displacing said first member and said second member relatively to engage said selector contact in electrical contact sequentially with said selectable contacts,
 (d) each said selectable contact being connected to one terminal of a respective impedance element of a set of impedance elements,
 (e) one of said selectable contacts being a reference contact,
 (f) one of said selectable contacts being an extreme contact having an extreme value of impedance connected thereto with respect to said reference contact,
 (g) an additional selectable contact being positioned intermediate and immediately adjacent the reference contact and the extreme contact with respect to a sequential path to be travelled by said selector contact during rotation of said first member relative to said second member,
 (h) an intermediate one of said selectable contacts positioned intermediate and spaced from the reference contact and the extreme contact with respect to said sequential path to be travelled by said selector contact, (i) the remainder of said selectable contacts and said intermediate selectable contact each being connected to an impedance connected at its opposite end to a reference point, each impedance connected between a selectable contact and said reference point having a different value from any impedance connected between said reference point and any other selectable contact, in an ascending order, so that as the selector contact is displaced along said path by one selector contact at a time in sequence between said reference contact and said extreme contact, the value of the impedance connected between said selector contact and said reference point will exceed the value of the impedance connected between the next preceding selector contact and the reference point, (j) said additional and intermediate selectable contacts being directly connected by a line.

3. A switching circuit including
(a) a continuously adjustable reversible multi-position switch, the switch having a selector contact and a plurality of selectable contacts,
(b) one of the selectable contacts being an intermediate contact,
(c) the contacts adjacent said intermediate contact having the ends of a chain of impedance elements connected thereto,
(d) each of the impedance elements in the chain being connected between a different adjacent pair of said selectable contacts with the exception of the intermediate contact,
(e) the intermediate contact being directly connected by a line to one of the selectable contacts connected to impedance elements intermediate the ends of the chain of impedance elements.

4. A switching circuit including
(a) a multi-position, continuously adjustable reversible switch having a selector contact and a plurality of selectable contacts,
(b) the selector contact being adjustable to a plurality of positions of contact with one of the selectable contacts in a predetermined reversible sequence according to the displacement of the selector contact relatively to the selectable contacts,
(c) a pair of said selectable contacts comprising extreme contacts,
(d) electrical elements connected between each of selectable contacts and a reference point in an order in which the value of each of said electrical elements connected between individual ones of said selectable contacts and a reference point differs from the value of the electrical elements connected between the next adjacent contact and said reference point in accordance with said predetermined reversible sequence between said extreme contacts from an element having a low value connected between a first one of said extreme contacts and said reference point to at least one element having a high value connected between the other one of said extreme contacts and said reference point,
(e) an additional selectable contact positioned immediately adjacent and between the extreme contacts with respect to the predetermined sequence of displacement of the selector contact,
(f) the additional selectable contact being directly connected to one of the other selectable contacts intermediate the extreme contacts with respect to the relative displacement of the selector contact with respect to the selectable contacts.

References Cited by the Examiner
UNITED STATES PATENTS

| | | | |
|---|---|---|---|
| 1,868,403 | 7/1932 | Weller | 338—190 X |
| 2,808,547 | 10/1957 | Adler et al. | 323—43.5 X |
| 3,070,763 | 12/1962 | Reslock | 323—80 X |
| 3,171,906 | 3/1965 | Allison | 200—11 |
| 3,181,086 | 4/1965 | McCutcheon et al. | 333—81 X |

JOHN F. COUCH, *Primary Examiner.*

A. D. PELLINEN, *Assistant Examiner.*